United States Patent [19]
Stopa

[11] Patent Number: 5,586,430
[45] Date of Patent: Dec. 24, 1996

[54] BALANCED DUAL FLOW REGENERATOR HEAT EXCHANGER SYSTEM AND CORE DRIVING SYSTEM

[76] Inventor: John M. Stopa, 6659 W. Torch Lake Dr., Kewadin, Mich. 49648

[21] Appl. No.: 440,771

[22] Filed: May 15, 1995

Related U.S. Application Data

[62] Division of Ser. No. 301,003, Sep. 6, 1994, Pat. No. 5,538,073.

[51] Int. Cl.⁶ .................................................. F02C 7/105
[52] U.S. Cl. ............................................ 60/39.511; 165/8
[58] Field of Search ........................... 60/39.511, 39.512; 165/8

[56] References Cited

U.S. PATENT DOCUMENTS

2,865,611  12/1958  Bentele .............................. 60/39.511
4,121,417  10/1978  Koppenhofer et al. ............. 60/39.512
4,300,349  11/1981  Heckel ................................ 60/39.511
4,491,171   1/1985  Zenkner ................................. 165/8

Primary Examiner—Louis J. Casaregola
Attorney, Agent, or Firm—Casimir R. Kiczek

[57] ABSTRACT

A gas turbine engine includes a gas generator having a compressor, a first turbine member, and a combustor member between the compressor and the first turbine member for increasing the temperature of the fluid medium to be worked upon by the engine. A second turbine is located adjacent to the gas generator and it extracts energy from the fluid medium to produce rotary power. A heat scavenging member is located adjacent to the gas generator for extracting heat from the fluid medium after flowing from said second turbine and for transferring the heat into the fluid medium exiting the compressor by passing the fluid medium at least two times through the scavenging member to heat the fluid medium before flowing into the combustor member.

32 Claims, 6 Drawing Sheets

BALANCED DUAL FLOW REGENERATOR HEAT EXCHANGER SYSTEM AND CORE DRIVING SYSTEM

This application is a division of application Ser. No. 08/301,003, filed Sep. 6, 1994 and now U.S. Pat. No. 5,538,073.

BACKGROUND OF THE INVENTION

1. Field of the Invention

The invention relates to a gas turbine engine heat exchanger and a method of its assembly to the engine.

2. Prior Art

Gas turbine engines which utilize the Brayton Thermal Cycle tier automotive and industrial applications have been the subject of intense engineering study for nearly 50 years. What has evolved is a simple cycle consisting of an air compressor, a combustion section in which an air-fuel mixture is burned to form hot gases that reach 1600 degrees Fahrenheit temperature or greater. These hot gases are directed to the turbine sections to produce rotary motion which drives the air compressor and an engine output shaft. After the hot gases have passed through the turbine sections and prior to their being exhausted from the engine, it is desirable to extract as much heat as possible from the exhaust so as to reduce the fuel consumption of the engine. This is accomplished by transferring the heat energy from the hot exhaust to the relatively cooler compressed intake air prior to its mixture with fuel and subsequent burning in the combustion chamber. The most popular type of heat exchanger used to accomplish this heat energy transfer is a regenerator which employs a rotating cylindrically shaped disk or drum.

Typically, a regenerator consists of a core which is either made from ceramic or metallic material. The core permits the flow of gases through a plurality of passages formed in the material. The hot gases exiting from the turbine section are passed through the passages of one sector in the regenerator core in one axial direction and the core material is heated. As the core is rotated, the absorbed heat is transferred to the incoming cooler compressed air which passes through the same sector of the regenerator in an opposite direction. As a result, less fuel is burned in the combustion chamber to heat the compressed air to the desired turbine inlet temperature.

This cyclic thermal loading on the regenerator matrix causes the core to distort and bow or dish slightly from the desired parallel plane condition to a concavo-convex condition, the cooler face being concave and the hotter face being convex. This warping condition causes a variable dimension relationship between various elements of the mechanism which is used to rotatably drive the regenerator core. This results in excessive wear and noise which is particularly objectionable in industrial and automotive engines. Thus, the choice and the design of the regenerator drive has been severely restricted and the economy of its structure has been sacrificed.

In a regenerator system, an annular metal drive member in the form of a ring gear surrounds the exterior periphery or cylindrical surface of the core. Because the annular metal drive member and the regenerator core may have substantially different thermal coefficients of expansion, they are normally designed not to be in contact with one another. For this reason, the annular ring is spaced from the regenerator core member, and a resilient member is provided for transmitting torque from the annular drive member to the regenerator core.

The resilient member for transmitting torque from the drive ring to the regenerator core has taken several forms in the prior art. In U.S. Pat. No. 3,363,478 to Lanning, U.S. Pat. No. 4,301,741 to Paluszny et al. U.S. Pat. No. 3,430,687 to Wardale, U.S. Pat. No. 3,534,807 to Bracken and U.S. Pat. No. 3,693,703 to Stockton, the resilient members comprise various forms of springs compressed between the ring gear and the regenerator core. Resilient members in the form of elastomeric materials compressed between the inner surface of the drive ring gear and the periphery of the regenerator core are described in U.S. Pat. No. 3,525,384 to Horton, U.S. Pat. No. 3,586,096 to McLean, U.S. Pat. No. 3,666,000 to Blech et al., U.S. Pat. No. 3,741,287 to Mittman and U.S. Pat. No. 4,151,873 to Lewakowski. None of the above approaches have been found to be satisfactory in retaining the ring gear onto the core and some have created other problems such as core cracking, elastomer bond failure, high torsional wind-up and seal failures.

In regenerative automotive and industrial gas turbine engines, there have been numerous attempt to solve the core failures experienced due to the uneven fluid and/or thermal forces on the rotating disk. For example, in U.S. Pat. Nos. 3,985,181 and 4,057,102, Guillot uses a tie rod to connect the outer regenerator cover and the frame of the main housing together to prevent cover blow-out. Guillot also reduces the effect of hydraulic forces by reducing the sector of the cooling air to be heated by the regenerator core to 120 degrees. None of the prior art designs have solved the problem of regenerator core distortion and pinching of the core between the engine housing and the exhaust covers due to the uneven thermal expansion of the mating components which results in excessive core drag, wear and noise as discussed in U.S. Pat. No. 3,177,735 to Chute. Because of these problems, the commercial success of regenerative gas turbine engines has been limited.

In practice, none of the prior art designs have been found to be satisfactory because the thermal expansion of the different components and the different fluid forces which act on the system have been difficult to analyze. None of the above cited prior art designs have recognized the need to isolate the regenerator core from the engine main housing so as to minimize the interaction of the thermal expansion of the housing with the heat exchanger system, the need to control both the fluid and thermal forces acting on the core and finally the need for a regenerator drive system that is independently controlled from the main engine drive system.

SUMMARY OF THE INVENTION

In accordance with the present invention, a gas turbine engine for producing power from a fluid medium includes a gas generator section with a compressor section which compresses the fluid medium, a first turbine section for driving the compressor section and a combustion section in between the compressor section and the first turbine section for increasing the temperature of the fluid medium prior to the first turbine section. A second turbine section is located adjacent to the gas generator section for extracting heat to produce motive power from the fluid medium as the fluid medium passes through the second turbine section. Additionally, a heat scavenging member is located adjacent to the gas generator for extracting heat from the fluid medium after flowing from the second turbine and for transferring heat into the fluid medium after passing the fluid medium from the compressor section at least two times through the heat scavenging member.

An object of the present invention is to provide a heat exchanger system that reduces the thermal load on the regenerator core and permits the core to be rotated in either a clockwise or counterclockwise direction.

Another object of the invention is to provide a side cover with axial support for the regenerator core which minimizes the effects of thermal distortion of the housing on the regenerator core and the regenerator drive system.

Another object of the invention is to provide a dual flow path heat exchanger system that reduces thermal distortion on the component parts and is economically manufactured and assembled.

Another object of the invention is to provide a rotary, regenerator system whereto the hydraulic forces acting on the core are balanced during operation so as to prevent core cocking and excessive wear and noise which is particularly objectionable on automotive and industrial applications.

Another object of the invention is to provide a drive mechanism for regenerator core having a coaxial peripheral rim, the drive mechanism including a ring gear arranged coaxially around the periphery of the rim and engaging the core by means of a clamp which applies a compressive load to the side walls of the core adjacent to the rm portion. Thus upon warping of the regenerator core, the rim can be distorted torsionally with respect to the ring gear without causing appreciable shifting of the ring gear from its desired coaxial alignment with the axis of the rotation of the regenerator. The power driven pinion gear in mesh with the ring gear is readily maintained in substantially uniform driving engagement with the ring gear so as to minimize excessive binding and looseness during operation so that noise and wear are minimized in the meshed gears.

Another object of the invention is to provide a drive mechanism to the ring gear that is flexible and yet provides substantially uniform driving engagement with the ring gear during operation of the engine.

Another object of the invention is to provide a regenerator drive mechanism that regulates the rotation of the pinion drive gear in response to various engine conditions and independently of engine speed.

This and other objects and advantages of this invention will be apparent from the description given herein.

DESCRIPTION OF THE PREFERRED EMBODIMENTS

Figure 1:
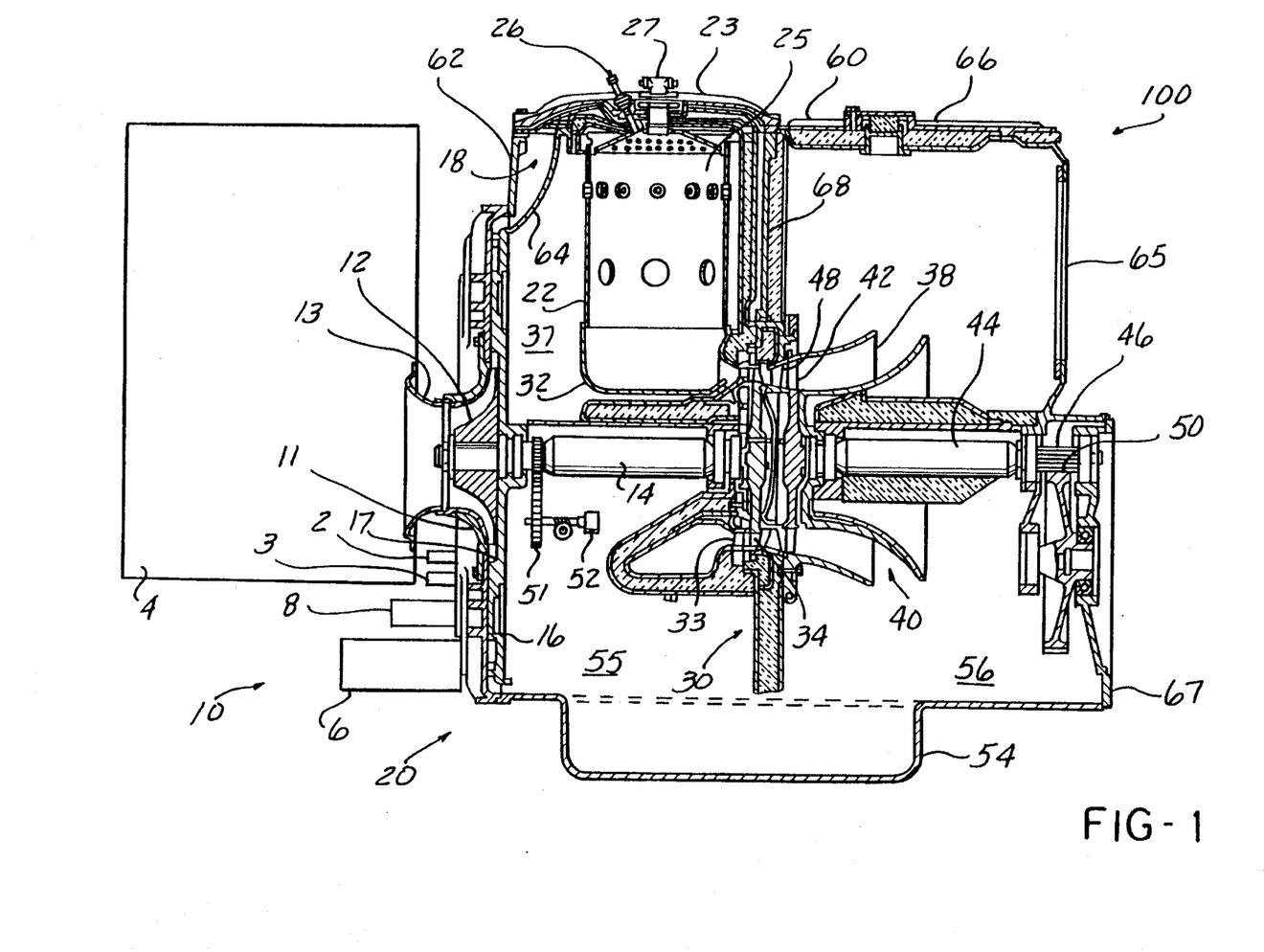
FIG. 1 is a cross sectional view of a preferred embodiment of the gas turbine according to my invention.
Figure 2:
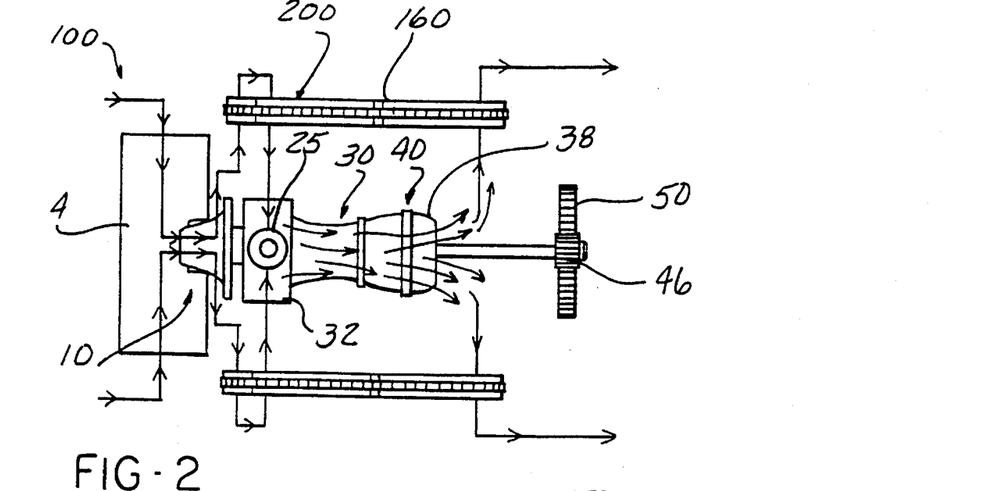
FIG. 2 is a schematic flow diagram of the gas turbine engine shown in FIG 1.
Figure 5:
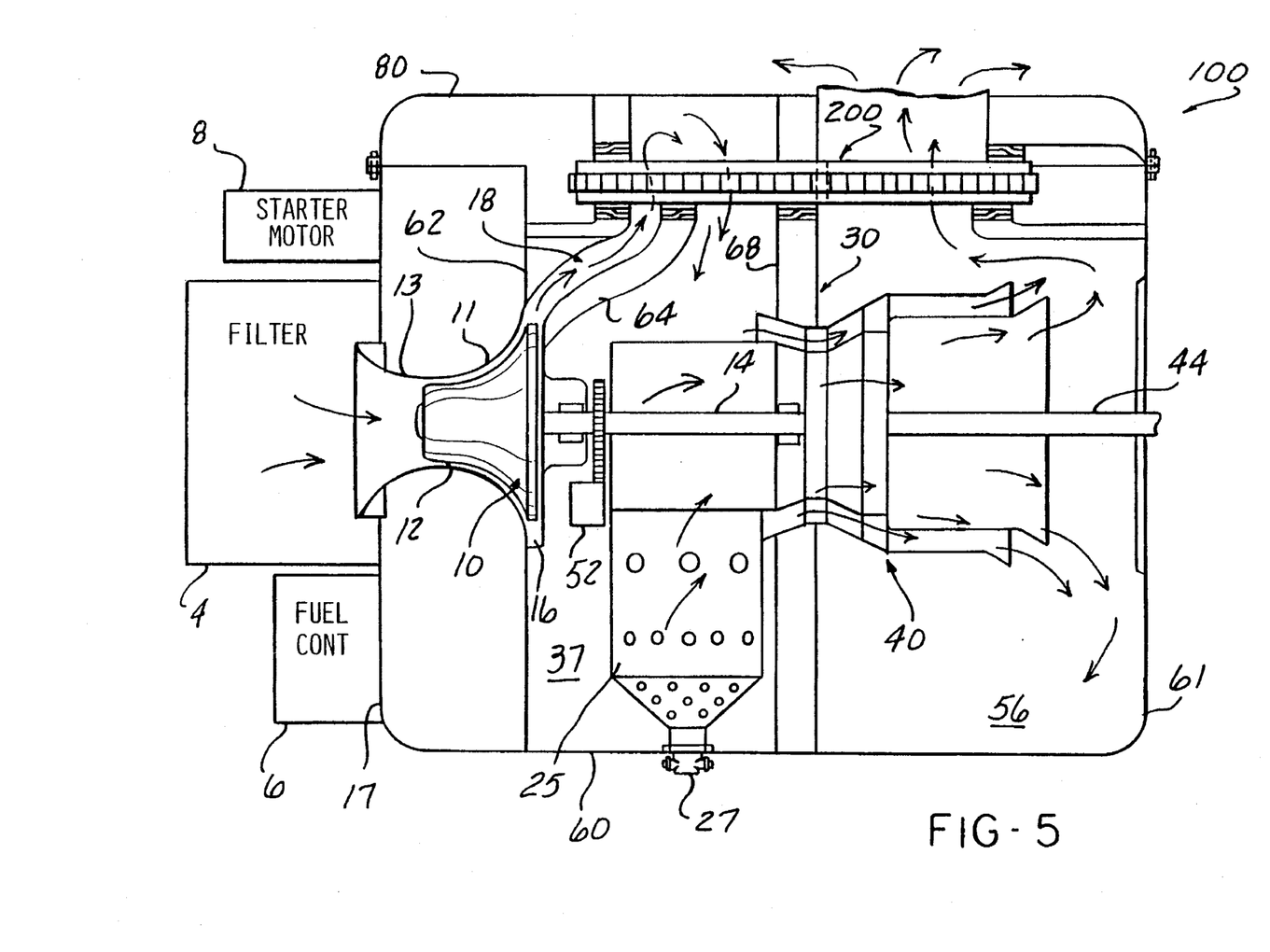
FIG. 5 is cross sectional view of an alternate embodiment of a gas turbine engine.

The major components of the preferred embodiment of the engine 100 include a compressor 10, a combustion chamber 25, and a turbine assembly 30 which drives the rotor 12 of the compressor 10 through a shaft 14 as shown in FIGS. 1, 2 and 5. These parts make the gas generator's 20 principal components which form a major sub-assembly of the engine 100.

The gas generator 20 produces the motive fluid for a power turbine assembly 40 which includes a wheel 42 mounted to a shaft 44 which is supported on a pair of bearings. The shaft 44 also has a pinion 46 for driving output gears 50. The gas generator shaft 14 is supported by a pair of bearings within a shaft housing. One of the bearings is mounted in a compressor rear plate which is the rear cover of the compressor and incorporates a plurality of diffusing passages 16 extending spirally from the compressor rotor and discharges the compressed fluid medium Into an annular chamber 18. The other bearing is mounted in the rear end of the shaft housing. A flange 15 and the diffuser plate 16 are connected by a plurality of fasteners to the compressor front cover 17. A shroud 11 is attached to the compressor front cover 17 to direct the incoming fluid medium so as to be worked on by the compressor rotor 12. The fluid medium may be air, oxygen, or any other fluid that will combine with fuel to form products of combustion. An inlet fitting 13 is bolted to the shroud 11. A filter member 4 is bolted onto the inlet fitting 13 so as to remove any harmful entrained foreign particles in the fluid. The compressor front cover 17 is secured to the housing 60 of the gas turbine engine 100 by a plurality of fasteners. A conventional electric starter motor 8, an alternator 3, a hydraulic motor 2 and a conventional fuel control assembly 6 are also mounted to the compressor front cover 17.

The compressor fluid plenum chamber 18 is defined by a front housing portion 62 and an internal front structure 64. The chamber 18 connects the compressor discharge to the heat scavenging member 200, as shown in FIG. 2. A vertical bulkhead wall 68 extends from the top portion 66 of the housing 60 to the bottom portion 67. The bulkhead divides the housing cavity eccentrically into a slightly larger front section and a slightly smaller rear section. In the front section, between the internal front structure 64 and the bulkhead wall 68, a combustion inlet fluid chamber 37 is formed and distributes the fluid medium exiting from the heat scavenging member 200 toward the combustion chamber 25.

The combustion chamber 25 consists of a top cover 23, a fuel injection system 27, and an ignition system 26. The top cover 23 is fastened to the top portion 66 of the housing 60 by conventional fasteners. The combustion chamber 25 has a tubular nose portion with a groove which is fitted into an aperture in the cover 23 and is secured to the cover by a circular clip in the groove. The fuel injection system 27 is inserted into the nose portion of the combustion chamber 25 and is secured to the top cover 23 by conventional fastening means. The combustion chamber 25 also consists of a tubular assembly 22 which has a plurality of apertures thereto to control the mixing of the fuel and the fluid medium and the final temperature of the products of combustion exiting from the combustion chamber 25.

Figure 7:
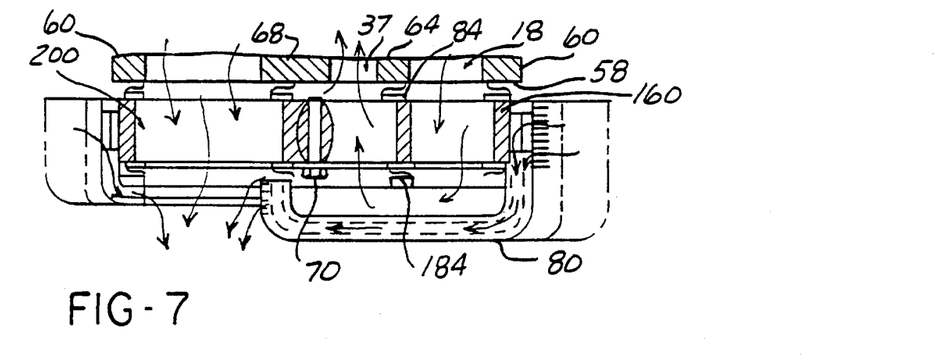
FIG. 7 is a cross sectional view of the side cover and core of the alternate embodiment according to my invention.
Figure 8:
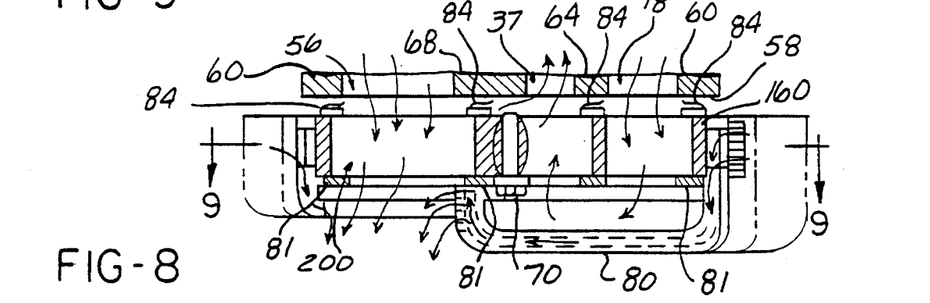
FIG. 8 is a cross sectional view of the side cover and core of the preferred embodiment according to my invention.

The combustion inlet chamber 37 receives heated, high pressure fluid medium from the heat scavenging member 200. Electricity from a conventional alternator 3 produces an ignition source for the ignition system 26 and for the core electric drive. Fuel from the fuel control system 6 is combined with the heated pressurized fluid medium in the combustor member 25 to form products of combustion or exhaust gases to a temperature of least 1600 degrees Fahrenheit or higher. These hot fluids or gases are distributed around the turbine assembly 30 by a scroll 32 prior to being directed past conventional gasifier turbine nozzle vanes 33 to impinge on the gasifier turbine wheel 34. Once the gases pass through the gasifier turbine wheel 34, they are directed radially through conventional second turbine nozzle vanes 48 to impinge on the power turbine wheel 42. The power turbine wheel produces rotary motive power. After passing through the gasifier turbine assembly 30 and the power turbine section 40, the exhaust gases pass through a radial exhaust shroud 38 and into the rear section chamber of the housing 60 formed between the bulkhead wall 68 and the rear portion 65. From the rear section chamber, the exhaust gas fluids pass through the heat scavenging member 200 and are then vented out of the engine through an exhaust outlet in the side cover 80, as shown in FIG. 7 and 8. The side cover member 80 is secured to the housing 60 by conventional fasteners. The side cover member 80 encapsulates the scavenger member 200 so as to provide a separate fluid passage for the hot exhaust gases and a separate passage 78 for the relatively cooler high pressure fluid medium exiting from the compressor 10. The high pressure fluid medium exiting the compressor 10 is directed by chamber 18 to flow through the porous portion 164 of the core 160 and is received into passage 78.

Returning back to FIG. 1, an oil pump 52 feeds a positive pressure lubrication system from oil which is collected in a sump 54. The sump 54 is fastened to the bottom portion 67 of the housing 60. Because relatively high temperatures are encountered in the turbine assembly 30 and the power turbine section 40, it has been found desirable to use a synthetic lubricating oil, though other lubricants may be acceptable. The oil pump 52 is mechanically driven by the shaft 14 through a set of gear teeth 51. As the oil leaves the outlet orifice in the oil pump 52, the high pressure lubricant is conducted by tubing to the pair of bearings supporting shaft 14, the bearings supporting the shaft 44, the set of gears, 51 driving the oil pump, the starter motor bearings and the pinion 46 and the output gear 50. Lubricant which escapes the bearings and gears returns by gravity feed to the sump 54.

A hydraulic pump 2 is mounted on the front cover to provide fluid power to the hydraulic driving motor which will be described later on herein. Likewise, an alternator 3 is mounted to the front cover to provide electricity to the electric driving motor which will be described later on herein.

The conventional fuel control system 6 monitors the speed from the gasifier shaft 14, the speed of the power turbine shaft 44 and optionally measures the temperature of the hot gases prior to the gasifier turbine assembly 30 or alternately after the power turbine section 40, so as to control the supply of fuel which is fed into the combustion chamber 25 in response to engine speed, gas temperature and external command signals.

As shown in FIGS. 5,7 and 8, the heat scavenger member or heat exchanger 200 is a disk shaped regenerator core 160, made from low expansion glass ceramic material described in U.S. Pat. No. 3,112,184. The core 160 is mounted rotatably on a pin 70 and a carbon barrel 170. The internal portion of the core 160 is porous to gases flowing essentially parallel to the core rotational axis 162. The porous portion 164 of the regenerator core 160 can be made by a variety of methods such as winding corrugated and flat ceramic into a disc shape or extruding a slurry of ceramic into a section of porous ceramic, assembling a plurality of sections into a disc shape and ruing the slurry into a structural unit. A pair of circumferential grooves 166, 167 respectively, are formed on each side of the rim portion 168 of the regenerator core 160 for a purpose to be described later on herein.

Figure 9:
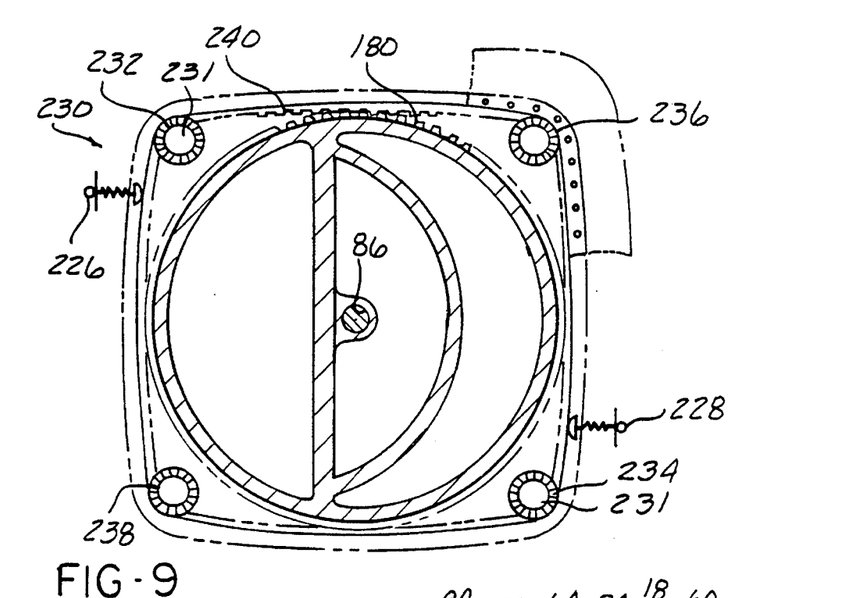
FIG. 9 is a section taken along 9—9 of FIG. 8.

Returning to FIG. 5, a pin 70 is theadably engaged into the side cover 80 in a location that is approximately opposite to the bulkhead wall 68. The regenerator core covers the rear cavity 56 and front cavity 55 of the housing 60 as shown in FIGS. 7 and 9. The housing 60 is an essentially elliptical shaped member and is sectioned along a major diameter of the ellipse on each side of the gas generator 20. As shown in FIG. 2, the gas turbine engine 100 has two regenerator cores. However, depending on the mass of fluid medium passing through the engine and the thermodynamic energy of the products of combustion, it is optionally possible that only one regenerator core is necessary to scavenge the heat effectively from the exhaust gases a shown in FIG. 5. It will be obvious to those skilled in the art that because each side of the heat scavenging system is identical only one side of the heat scavenging member 200 need be described in detail and that the cores may be rotated independently of one another in a clockwise or counterclockwise direction.

Returning to FIG. 5, a land area 58 is formed inside the housing 60 and terminates a short distance from the opening 57 formed by the sectioned ellipse 69. As noted previously, the bulkhead wall 68 divides the housing cavity 59 into a front section 62 with a front cavity 55 and a rear section 65 with a rear cavity 56. The front cavity 55 contains the compressor fluid plenum chamber 18 and the combustion inlet fluid chamber 37.

Figures 6, 10, 11, 12, 13, 16:
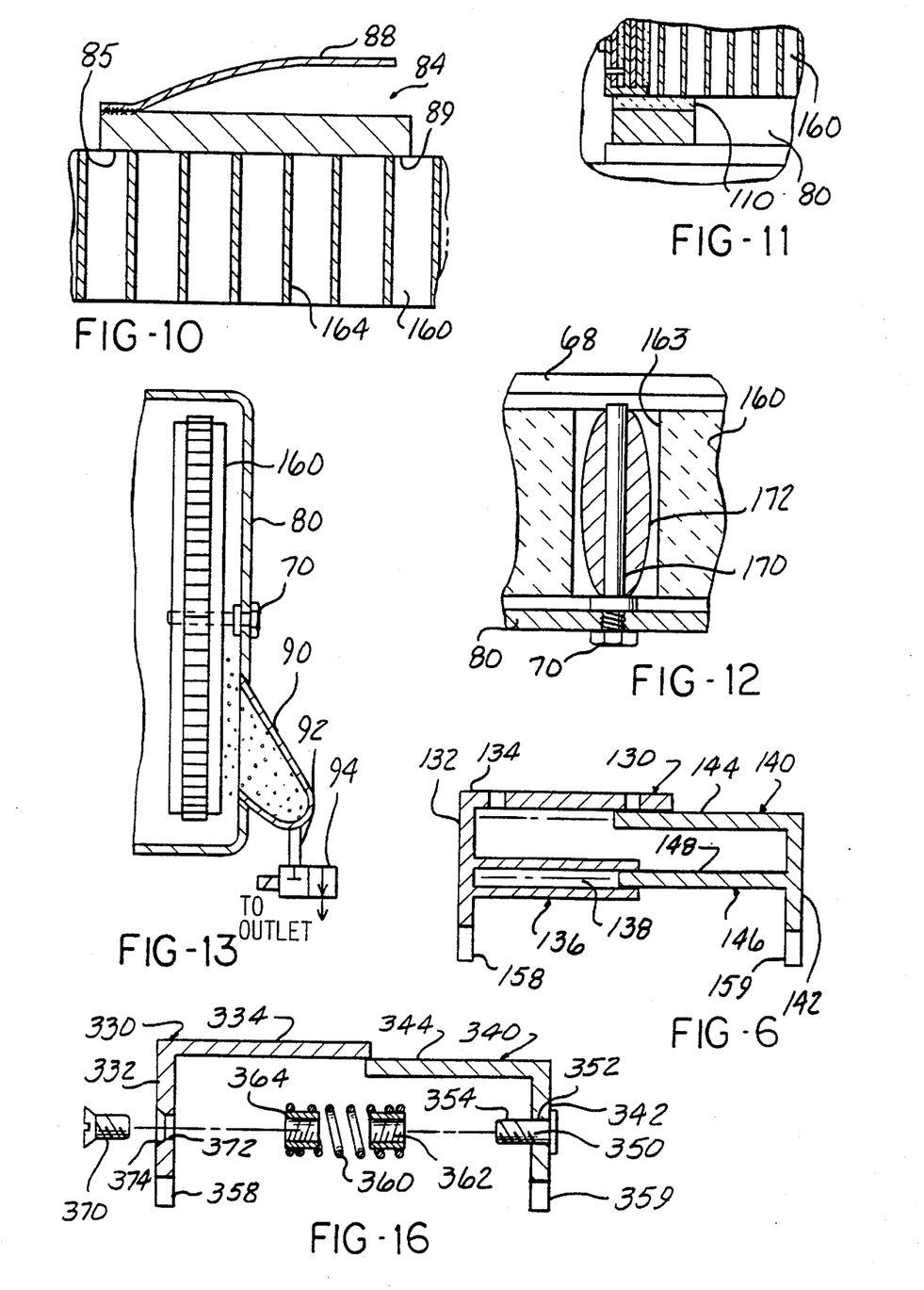
FIG. 6 is an exploded cross sectional view of the clamp shown in FIG. 3.
FIG. 10 is a partial sectional view of the diaphragm seal against the core.
FIG. 11 is a partial sectional view of the rubbing seal against the core.
FIG. 12 is a partial sectional view of the side cover with the barrel and core support.
FIG. 13 is a partial sectional view of the dust collector in the side cover.
FIG. 16 is an exploded cross sectional view of an alternate construction of the clamp.

In the preferred embodiment of the core to housing sealing system, a diaphragm seal 84 which is made of a low wearing material combination and a metal diaphragm member, which will be described later on herein, are made to fit into the land area 58. Alternatively, in a second embodiment of the core to housing sealing arrangement, a ceramic coated rubbing seal 110 having the same shape as the land area 58 and placed thereon, is restrained from circular movement by fitting ribs 112 on the underside of the seal 110 and corresponding notches 108 in the land area 58 of the housing 60 provided a diaphragm seal is used between the side cover and the core as shown in FIG. 11.

The diaphragm seal 84 is attached to the housing 60 by conventional fasteners. The seal 84 is formed in the shape of one C-shaped element and another opposite shaped C-shaped element. The two C-shaped are joined together by a flat portion. A third larger arcuate C-shaped section is attached to one of the other C-shaped elements as shown in FIGS. 5 and 9. As shown in FIG. 10, the sealing surface 83 of the seal 84 is made from metal having a rubbing or wearing surface on one side 89 and a resilient biasing member on the opposite side 87. The rubbing surface 89 is plasma sprayed with a wear resistant material such as nickel oxide-calcium fluoride combination 85. The resilient biasing member is a stainless steel metal diaphragm member 88. The rubbing surface 89 is biased against the rotating core 160 by the diaphragm.

As is shown in FIG. 8, the preferred embodiment of the core to side cover sealing arrangement consists of a ceramic rubbing seal 310. The seal 310 has a ceramic coated rubbing seal having the same shape as the land area 79 in the cover 80 and placed thereon, is restrained from circular movement by fitting ribs on the underside of the seal and corresponding notches in the land area of the cover 80 provided that a diaphragm seal 84 is used between the homing 60 and the core 160. In an alternative embodiment of the core to side cover sealing arrangement, the rubbing surface of the side cover 80 is plasma sprayed with a wear resistant material such as nickel oxide-calcium fluoride combination 85. A diaphragm seal 84 is used between the housing and the core 160 when using this alternative embodiment of the core to side cover sealing arrangement.

In another alternate embodiment of the core to cover sealing arrangement, as shown in FIG. 7, a diaphragm seal 184 is attached to the side cover 80. The seal 184 is formed in the shape of one C-shaped element and another opposite shaped C-shaped element. The two C-shaped are joined together by a flat portion. A third larger arcuate C-shaped section is attached to one of the other C-shaped elements as shown in FIGS. 5 and 9. As shown in FIG. 10, the sealing surface 183 of the seal 184 is made from metal having a rubbing or wearing surface on one side 189 and a resilient biasing member on the opposite side 187. The rubbing surface 189 is plasma sprayed with a wear resistant material such as nickel oxide-calcium fluoride combination 185. The resilient biasing member is a stainless steel metal diaphragm member 188. The seal 184 has an off center hole 186 through the flat rubbing portion so as not to interfere with the function of the diaphragm. The rubbing surface 189 is biased against the rotating core 160 by the diaphragm 188. The core 160 has a central hole 163 into which a carbon barrel 170 is inserted. As shown in FIG. 12, the core 160 and the carbon barrel 170 are supported by the pin 70 which threadably engaged to the side cover 80.

In the preferred embodiment of the housing to core sealing arrangement and the core to side cover sealing arrangement, the seal 84 is fastened to the bulkhead wall 68 of the housing 60 by conventional fastener means. Then the core 160 is inserted over the pin and carbon barrel 170 in the side cover 80. The side cover and core are then attached to the housing 60 as a subassembly. The core 160 is biased against the rubbing surface 81 by the diaphragm 88 of the seal 84 pressing then core toward the side cover when the assembly is complete. The seal 84, which is fastened to the housing 60, has sufficient working height to bias the core 160 against the rubbing surface 81 under all operating conditions and to accommodate the thermal expansion of the bulkhead 68 without pinching the core 160 between the housing 60 and the side cover 80. In a second alternate embodiment of the core to cover sealing arrangement, a second diaphragm seal 184 similar in construction to seal 84 is sandwiched between the core 160 and the side cover 80. Those skilled in the arts will appreciate that during operation, the core 160 is subjected to varying thermal and hydraulic loads and thus, the two diaphragm seals 84, 184 respectively permit the core 160 to float between the housing 60 and the side cover 80. As stated previously, in the preferred embodiment of the core to housing sealing arrangement, a single diaphragm seal 84 provides sufficient working height to prevent pinching of the core 160 between the housing 60 and the side cover 80 under all thermal conditions.

The carbon barrel 170 is sized so that it fits over the pin 70 to permit a controlled amount of relatively cool fluid medium leakage from the passage 158 through the passage formed between the pin 70 and the barrel 170 so as to cool the barrel 170 and to permit the core 160 to rotate about the barrel 170 under the varying thermal conditions of the engine. The carbon barrel 170 has an elliptically shape outer surface 172 extending from one end 174 to the other end 176 so as to permit the inner diameter of the core 160 to move upon the crest 178 of the barrel 170 while rotating about the pin 70 so as to permit the core 160 to move in response to varying thermal and hydraulic conditions acting on the core 160 during operation.

Figure 3:
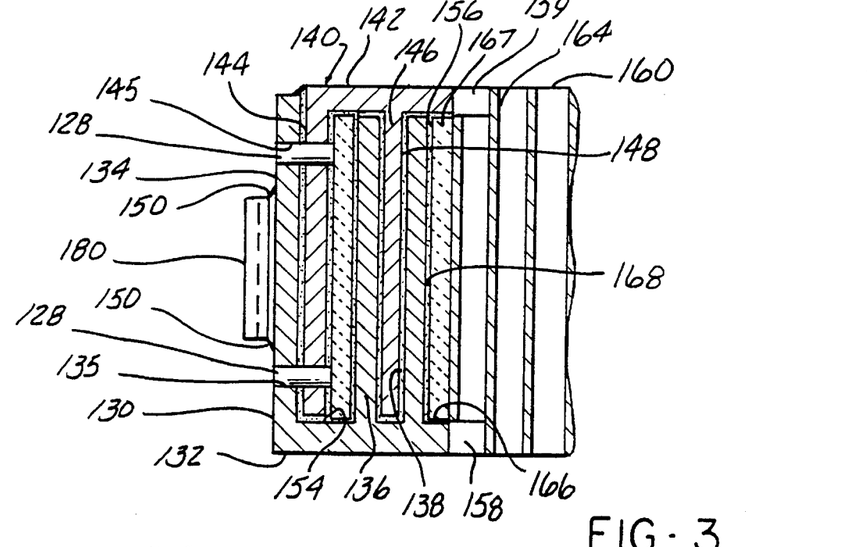
FIG. 3 is a cross sectional view of the clamp and regenerator core along 3—3 of FIG. 4.
Figure 4:
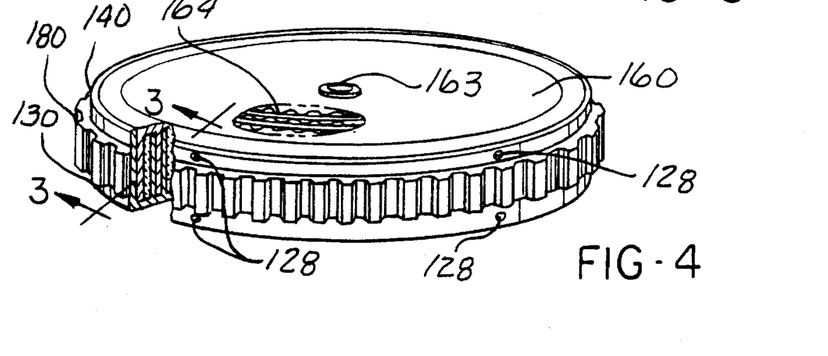
FIG. 4 is a perspective view of the preferred embodiment version of the regenerator core ring gear and clamp according to my invention.

As shown in FIGS. 3, 4 and 6, the preferred embodiment of the core driving mechanism consists of a plurality, of apertures 165 formed or drilled near the outer periphery of the core 160 and a plurality of corresponding frictional clamps 130, 140 respectively which are connected to each other by circumferential arcuate sections 158, 159 respectively. The circumferential arcuate sections 158, 159 respectively, fit into a pair of circumferential grooves 167, 168 respectively. The frictional clamps include a female F-shaped clamp 130 with a tubular portion which is inserted into one of the apertures 165 in the periphery of the core. The F-shaped female clamp section 130 consists of a radial leg portion 132 connected to the circumferential arcuate section 158, an essentially perpendicular plate portion 134 forming the top and a tubular portion extending perpendicular from the radial leg portion 132. The regenerator core 160 and the plurality of F-shaped female clamps 130 are placed into an oven and heated to approximately 1880 to 2000 degrees Fahrenheit for one hour.

The frictional clamp also includes a plurality of male F-shaped clamps 140 consisting of a radial portion 142 connected to the circumferential arcuate section 159, an essentially perpendicular plate portion 144 and a pin portion 146. The pin portion of the male F-shaped clamps are placed into the apertures 165 of the regenerator core 160 shortly after the core and female F-shaped clamp are removed from the oven. The plate portion 134 of the female F-shaped clamp 130 overlaps the plate portion 144 of the male F-shaped clamp 140 and the pin portion 146 is inserted into the tubular portion 136. The tubular portion 136 has a slightly smaller inner diameter 138 than the outer diameter 148 of the pin 146 at room temperature. When the F-shaped clamp is removed from the oven, its inner diameter 138 is in an expanded condition so that the inner diameter 138 fits over the room temperature outer diameter 148 of the pin 146. When the tube cools down, the inner diameter 138 shrinks to its normal diameter to form a frictional joint between the mating clamp members 130, 140 respectively. The plate portions of the male and female clamps 134, 144 respectively, are welded together by a series of stringer welds 150 after the assembly cools down to room temperature. Thus, the male and female clamps, 130, 140 respectively are held together and form a clamp which produces a slight compression at the rim of the core 160 and at the grooves 167, 168, respectively when the tube 136 and pin 146 cool down to a normal temperature. The clamps 130,140 respectively, when they compress the nm of the core 160, prevent any significant tangential movement between the core 160 and the clamping members 130, 140 respectively.

In the alternate embodiment of the frictional clamping members, as shown in FIG. 16, a threaded spring is employed to connect the male and female F-shaped clamps 330, 340 respectively together. The F-shaped female clamp 330 is fined into one groove 167 in the periphery of the core. The female clamp 330 consists of a radial leg portion 332 connected to the continuous circumferential arcuate section 158, an essentially perpendicular plate portion 334 forming the top and a countersunk hole formed in the radial leg portion 332. The female clamp 330 also has a tubular section 346 with a passage 348 formed therein. A male F-shaped clamp 340 consisting of a radial portion 342 connected to the continuous circumferential arcuate section 159, an essentially perpendicular plate portion 344 and an aperture 352 in the radial portion 342. The male F-shaped clamp 340 is placed into the other groove 166 of the regenerator core 160 and aligned with the apertures in the core. When assembled together, the plate portion 334 of the female F-shaped clamp 330 overlaps the plate portion 344 of the male F-shaped clamp 340. A threaded stud 350 is inserted through the hole 352 in the radial portion 342 of the clamp which has been previously aligned with an aperture 165 in the core. The hole 352 is slightly larger than the shank diameter of the stud 350. The threaded portion 354 of the stud is positioned concentrically into the tubular section 346 of the female clamp 330 and the stud is welded to the side of the clamp 340. A cylindrical coil spring 360 which has a threaded portion in the spring 360 which engages the threads on the stud 350. A countersunk screw 370 is inserted through an aperture 372 in the radial portion of the female F-shaped clamp 330. The head of the screw 370 fits up against the aperture but does not pass through the aperture. The head of the screw has a groove 374 which engages the tip of a screw driver. The screw 370 threadably engages a second threaded portion in the spring 360. As the head of the screw is rotated, the threads of the screw 370 engage the threads in the threaded portion of the spring 360 so as to pull the male portion of the F-shaped clamp 340 towards the female F-shaped clamp 330. After sufficient rotation of the screw, the spring pulls the clamps 330, 340 respectively, together so as to produce a compressive force on grooves 166, 167 respectively in each side of the core and thus grip the core 160. The plate portions 334, 344 respectively, are then welded together by a series of stringer welds.

A layer 156 of a room temperature vulcanization silicone elastomer which is capable of withstanding high temperatures such as Dow Corning Number 3120 rubber is pumped into the cavity 154 formed by the outer periphery 168 of the core 160, the overlapping plates 134, 144 respectively of the clamp members 130, 140 respectively or alternatively the clamps 330, 340 respectively and the apertures 165 in the core. To facilitate pumping of the uncurred elastomer into the cavity 154, two passage holes 152 are drilled into overlapping plates 134, 144 respectively or alternatively clamps 330, 340 respectively and the aperture 165 in the core so as to connect the cavity. 154 to the air surrounding the gear ring. The uncurred elastomer is pumped into the cavity 154 by conventional pumping methods. The uncurred elastomer does not completely fill the cavity 154 and some air is entrapped in the cavity 154. The entrapped air provides the elastomer with room to expand when heat is applied to the core 160 such as during engine operation. In order to obtain a bond between the periphery of the core and the clamping members 130, 140 respectively or clamps 330, 340 respectively, it has been found desirable to rotate the core at room temperature until the rubber skins over in approximately one hour. The uncurred elastomer vulcanizes by conventional means at room temperature to produce viscoelastic properties in the elastomer 156. The layer of cured elastomer 156 acts as an additional bond to secure the clamps 130, 140 respectively or clamps 330, 340 respectively to the rim portion 168 of the core 160 and to act as a shock absorber when the core rotation about the pin 70 is affected by the variable thermal load on the seals and the core caused by the varying, engine conditions.

Returning to FIGS. 3, 4 and 6, a metal ring gear 180 is heated to 500 degrees Fahrenheit and is fitted around the clamping members 130, 140 respectively or clamps 330, 340 respectively. The ring gear 180 is allowed to cool to room temperature so as to shrink fit over the clamps 130, 140 respectively or clamps 330, 340 respectively. The ring rear 180 is further fastened to the clamps 130, 140 respectively, or alternatively clamps 330, 340 respectively, by conventional fastener means such as a plurality of roll pins 128 which are inserted into a series of holes 152 drilled through the flange in the ring gear 180 and overlapping plates 134, 144 respectively in the clamping members 130, 140 respectively or the plates 334, 344 in the clamping members 330, 340 respectively. Thus, the ring gear is firmly secured to the clamps 130, 140 respectively or alternatively to the clamps 330, 340 respectively. The ring gear 180 engages the teeth 182 of a driving member 230.

Figure 1A:
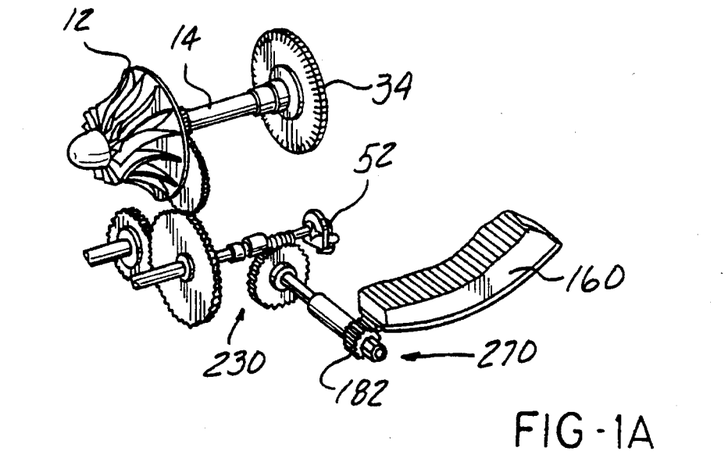
FIG. 1A is a partial perspective view of a regenerator pinion gear driving mechanism.
Figure 14:
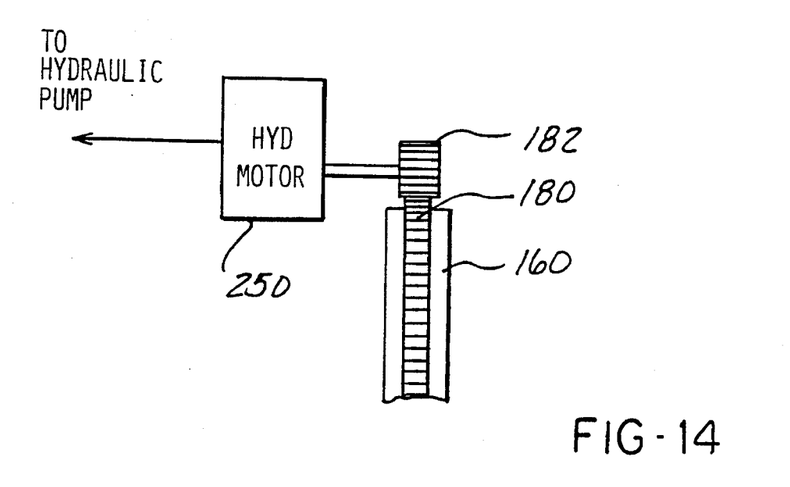
FIG. 14 is a schematic view of the hydraulic driving motor.
Figure 15:
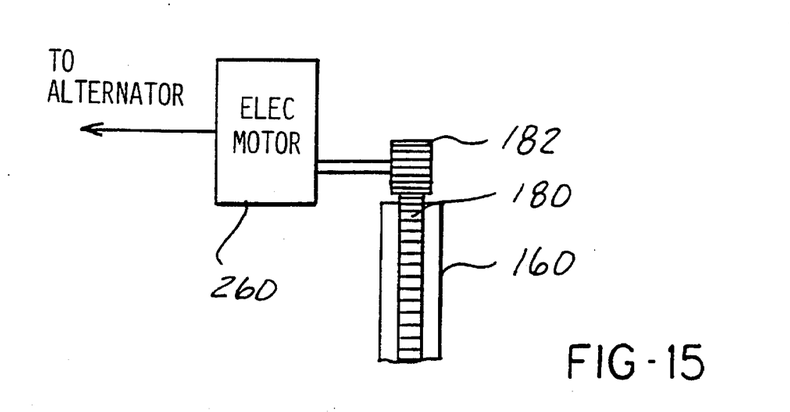
FIG. 15 is a schematic view of the electrical driving motor.

As shown in FIG. 9 the driving member 230 is preferably a pair of pinion gears 232, 234 respectively, that are, preferably, driven hydraulically by a hydraulic motor 250, as shown in FIG. 14 which is controlled by hydraulic fluid, or, alternately, mechanically through a gear drive 270 shown in FIG. 1A, or, alternatively, electrically by means of electric motors 260, as shown in FIG. 15. In the preferred embodiment, as shown in FIG. 9 the driving member consists of a elastomeric belt drive 240 made of hydrogenated nitrile and four pinion gears 232, 234, 236 and 238 respectively, which support the belt 240 around the periphery of the ring gear 180. The timing belt 240 has teeth 242 that mesh with the teeth 182 formed in the ring gear 180 and the four gears 232, 234, 236 and 238 respectively, as shown in FIG. 9. Two of the four gears, 232, 234 respectively are driven by driving motors 231. In the preferred embodiment, the driving motor is a hydraulic motor that obtain its motive power from the hydraulic pump 2 as shown in FIG. 14. The operation of the hydraulic motors is controlled by a solenoid valve in response to an electrical impulse from the fuel control 6 so as to regulate the amount of hydraulic fluid to the hydraulic motors and thus the power to the power gears 232, 234 respectively. Return to FIG. 9, the belt drive 240 is positioned over the four gears 232, 234, 236, 238 respectively such that the teeth 242 formed on the underside of the timing belt 240 engage the gear teeth 182 in the ring gear 180. Two idler pulleys 226, 228 respectively, are pivotably mounted to the housing 60 and are biased by a spring members 224 to press the pulleys in contact with the back side of the belt 240. The idler pulleys 226, 228 respectively, thus maintain belt drive tension to assure sufficient belt wrap over the ring gear and they also function to absorb belt stretch or shock during operation of the engine 100. In the preferred embodiment, the rotational speed of the core 160 is thus controlled by the amount of hydraulic fluid permitted to flow to the hydraulic motor by the solenoid valve. Alternatively, the pinion gears which are driven mechanically from the gasifier unit 20 through a gear train 51 as shown in FIG. 1A can also be used to rotate the cores 160. In another embodiment, the driving motors 230 can be driven by electric motors which are powered by electricity from the alternator 3 as shown in FIG. 15. During the engine start mode, it has been found desirable to not permit the core to 160 rotate as this helps the ceramic matrix to heat up faster. Once the ceramic matrix reaches a certain predetermined temperature or after a predetermined period of time, the core 160 is then permitted to rotate at a speed that varies with engine speed and load. At 100% gas generator or compressor shaft speed, the core rotates at 15 to 20 revolutions per minute. At gasifier idle speed, the rotation of the core 160 is reduced to 2 to 3 revolutions per minute. Controlling the core rotational speed over the operating range of the engine in response to varying engine power settings, such as by engine torque or engine throttle position. assures the optimum thermal performance of the heat scavenging member 200. Those skilled in the arts will recognize that the drive system described heretofore is capable of being driven in a clockwise or counterclockwise rotational direction.

In order to minimize the cog belt operating temperature, ambient air is introduced into a cavity that surrounds the ring gear 180 and cog belt 240. As shown in FIGS. 7 and 8, the cavity 95 surrounding the ring gear 180 is vented to the atmosphere through a plurality of holes 96. In order to induce the atmospheric air to enter into the cavity 95, at least one passage 97 is drilled or formed near the exhaust outlet 82 of the side cover 80 such that the velocity of the exhaust gases exiting from the engine cause a pressure drop adjacent to the passage 97 so as to induce flow of relatively cooler atmospheric air to flow into the cavity 95 through the holes 96. To prevent the ingress of dirt, a filter member 98 is secured over the holes 96.

As shown in FIGS. 2 and 5, the relatively cool compressor fluid is made to turn 180 degrees after passing through the core 160 the first time. The abrupt change in flow direction has a tendency to separate any entrained particles from the fluid. Once separated, the particles fall by gravity toward the lower portion of the side cover 80 where they are collected in a chamber 90, as shown in FIG. 13. The chamber 90 is connected to the exterior of the engine by a passage 92 which is controlled by a solenoid valve 94. When the engine is a idle or just before shut down the solenoid 94 is activated by electricity to permit the accumulated particles to pass from the collection chamber 90 through a tubular passage 93 and out of the engine. The accumulated particles are forced out of the engine by compressor fluid medium pressure which is higher than the atmospheric pressure surrounding the engine.

In operation, the starter 8 is engaged in a conventional manner to start the rotation of the gasifier section 20. At the same time, the fuel control 6 feeds fuel to the fuel injector 27 and the ignition source is activated and the spark plug 26 begins to spark. As the compressor rotor 12 is rotating, oxidizing fluid is caused to move into the filter 4 then through the inlet flange 13 and the shroud 117 through the rotor 12 and into the diffusing passages 16. The relatively cool compressed fluid medium exiting the diffusing passages 16, passes into the compressor fluid chamber 18 and is directed to pass through the passages in the porous portion 164 of the core 160. After passing through the core 160, the oxidizing fluid enters the cavity 78 formed in the side cover 80. The fluid is redirected back through the porous portion 164 of the core 160, into the combustion inlet chamber 37 and into the combustion chamber 25. The compressed fluid medium is mixed with fuel in the combustion chamber 25 and the spark plug 26 causes ignition so as to cause the fluid medium and fuel burn so as to form products of combustion or gases. These gases are relatively hot and are directed into the scroll 32, the nozzle vanes 33, the turbine wheel 34 and then through the power turbine section 40. After passing through the power turbine nozzle 48, the power turbine wheel 42 and the diffuser 38, the hot gases enter the rear cavity 56 of the housing 60. The gasifier turbine wheel 34 extracts energy from the hot gases which causes the gasifier rotor to rotate and provide power to the rotor to compress the incoming oxidizing fluid passing through the rotor 12. Similarly, the power turbine section 40 extracts energy from the hot gases that have previously passed through the gasifier turbine 20. This causes the power turbine wheel 42 to rotate and provide motive power to the output shaft 44. Once past the power turbine section 40, the still relatively hot gases are caused to pass through the porous portions 164 of the core 160 so as to heat the core and exit out of the engine through the side cover outlet 82.

In the preferred embodiment of the engine, the core 160 remains stationary until a predetermined temperature of 1000 degrees Fahrenheit or more is reached or a predetermined time passes. Once either one or both of these predetermined limits is reached, the solenoid valve 252 is opened which permit hydraulic fluid to flow into two conventional hydraulic motors 250. The pair of conventional hydraulic motors 250 are caused to rotate when the hydraulic fluid passes through them which provides power to the two pinion gears 232, 234 respectively. The pinion gears 254 on the hydraulic motors 250 engage the teeth 242 of the cog belt to rotate the cog belt 240. The cog belt teeth 242 engage the ring gear teeth 182 so as to rotate the core 160. The cog belt absorbs any abrupt changes in power required to rotate the core 160. These abrupt changes are caused by thermal expansion of the housing 60 relative to the core 160 or the side cover 80 relative to the core 160 and hydraulic forces acting on the core 160 during operation. As stated previously, the hot gases exiting from the power turbine section 40 are passed through porous section 164 of the passages of one sector in the regenerator core 160 in one axial direction and the core material is heated. As the core 160 is rotated, the absorbed heat in the core is transferred to the incoming cooler compressed fluid medium which passes through the same sector of the regenerator in an opposite direction and cools the core 160. As a result, less fuel is required to heat the compressed fluid medium to the desired temperature in the combustor prior to entering the gasifier turbine assembly section 30. Because the fluid medium is caused to pass twice through the core 160 prior to entering the combustor 25, the hydraulic forces on the core 160 are more evenly balanced so that the core is more stable rotating about the carbon barrel 170 and the pin 70. The fluid medium is prevented from leaking at the interface of the housing and the rotating core 160 by means of diaphragm seals 84 which minimize the fluid leakage past the land area 58 of the housing 60 while at the same time forcing the rubbing surface 81 to remain in contact with the core 160 during operation. Similarly, in the alternate embodiment of the core to side cover sealing arrangement, the second diaphragm seal 184 prevents gases from leaking past the land area 79 in the side cover and the core 160. In all the other alterative sealing arrangements, one diaphragm seal has sufficient working height to permit rotation of the gore and yet to eliminate the need for two diaphragm seals.

In another alterative embodiment of the core driving system, the cog belt 240 is driven electrically by pinion gear 264 which is driven by a conventional electric motor 260 which receives electrical power from the alternator 4 and is regulated by means of signals from the fuel control 6. The cog belt engages the teeth on the ring gear to came the core 160 to rotate when the driving means is engaged. In a still another embodiment of the core driving system, the gear tram 270 drives the pinion gear 274 through a gear train 51 from the gasifier shaft 14 as shown in FIG. 1A. The pinion gear drives the ring gear directly. In this embodiment, the core is rotated at a speed proportional to the gasifier turbine speed.

After passing through the core 160 the first time, the fluid medium is caused to turn abruptly prior to passing through the core 160 the second time. As this occurs, the abrupt change in flow direction has a tendency to separate any heavier entrained particles from the oxidizing fluid medium. Once separated, the particles fall by gravity toward the lower portion of the side cover 80 where they are collected in a chamber 90. The chamber 90 is connected to the exterior of the engine by a passage 92 which is controlled by a conventional solenoid valve 94. When the engine is a idle or just before shut down the solenoid 94 is activated by electricity from the alternator 4 to permit the accumulated particles to pass from the collection chamber 90 through the passage 93 and out of the engine. The accumulated particles are vented out of the engine by compressor fluid medium pressure.

While the has been described in connection with a number of embodiments, it will be understood that it is not intended to limit the invention to these embodiments. On the contrary, it is intended to cover all alternatives, modifications, and equivalents as may be include within the spirit and scope of the invention as defined by the appended claims.

What I claim is:

1. A gas turbine engine for producing power from a fluid medium, said turbine engine comprising:

a gas generator having a compressor member for compressing the fluid medium, a first turbine member for driving said compressor member and a combustion member interposed said compressor member and said first turbine member for increasing the temperature of the fluid medium prior to said first turbine member;

a second turbine member adjacent to said gas generator for extracting power from the fluid medium as the fluid medium passes through said second turbine member; and a rotary heat scavenging member adjacent to said gas generator, said rotary heat scavenging member passing the fluid medium from said compressor member at least two times through said rotary scavenging member and passing the fluid medium from said second turbine once through said rotary scavenging member.

2. A gas turbine as claimed in claim 1 wherein said rotary scavenging member further including:

a pair of regenerator cores having a porous portion for passing the fluid medium through said core.

3. A gas turbine as claimed in claim 2 wherein said rotary scavenging member further including:

a drive member connected to each of said pair of cores so that in one predetermined condition each of said pair of cores are stationary and in another predetermined condition each of said pair of cores are rotated in response to the power condition produced by the engine.

4. A gas turbine engine as claimed in claim 1 wherein said rotary scavenging member further comprises:

a disc mounted adjacent to said second turbine member;

a clamp frictionally connected to said disc; and a driving motor mounted adjacent to said disc for rotating said disc.

5. A gas turbine engine as claimed in claim 4 wherein said clamp further including:

a male portion: and a female portion connected to said male portion to form a compressive load on the side of the disc.

6. A gas turbine engine as claimed in claim 4 wherein said driving motor further including:

a ring gear attached to said clamp; and a mechanical drive connected to said gas generator and engaging said ring gear to rotate said disc.

7. A gas turbine engine as claimed in claim 4 wherein said driving motor further including:

a ring gear attached to said clamp; and a hydraulic motor connected to said gas generator and engaging said ring gear to rotate said disc.

8. A gas turbine engine as claimed in claim 4 wherein said driving motor further including:

a ring gear attached to said clamp; and an electric motor connected to said gas generator and engaging said ring gear to rotate said disc.

9. A gas turbine engine as claimed in claim 1 further comprising:

a particle collector adjacent to said heat scavenging member; and a valve attached to said collector for passing the particles out of the engine.

10. A gas turbine engine as claimed in claim 4 further comprising:

a side cover adjacent to said disc;

a pin mounted to said side cover; and a carbon barrel interposed said pin and said disc, said carbon barrel having portions defining a passage to permit the fluid medium to flow through said carbon barrel.

11. A gas turbine engine comprising:

a housing having portions defining a first cavity and second cavity adjacent said first cavity, said first cavity having portions defining a pair of passages;

a gas generator mounted in said first cavity;

a power turbine mounted in said second cavity; and a rotary heat exchanger adjacent to said housing, said pair of passages of said first cavity connected to said rotary heat exchanger and said second cavity having portions defining a third passage connected to said rotary heat exchange.

12. A gas turbine engine as claimed in claim 11 further comprising:

a side cover adjacent to said heat exchanger so as to connect said pair of passages in said first cavity.

13. A gas turbine engine as claimed in claim 12 wherein said cover further including portions forming a cavity surrounding said heat exchanger.

14. A gas turbine engine as claimed in claim 11 wherein said heat exchanger further comprises:

a disc mounted adjacent to said power turbine member;

a clamp frictionally mounted to the side of said disc; and driving means, mounted adjacent to said disc, for rotating said disc.

15. A gas turbine engine as claimed in claim 14 wherein said clamp further including:

a male portion having an F-shaped section;

a female portion having an F-section and connected to said male portion to form a compressive load on each side of the disc; and an elastomer interposed said male and female portions.

16. A gas turbine engine as claimed in claim 14 wherein said driving means further including:

a ring gear attached to said clamp; and an electric motor connected to said gas generator; and a cog belt connecting said ting gear to said motor.

17. A gas turbine engine as claimed in claim 14 wherein said driving means further including:

a ring gear attached to said clamp; and a hydraulic motor connected to said gas generator; and a cog belt connecting said ring gear to said motor.

18. A gas turbine engine as claimed in claim 14 wherein said driving means further including:

a ring gear attached to said clamp; and a mechanical drive connected to said gas generator, said mechanical drive engaging said ring gear to rotate said disc.

19. A gas turbine engine as claimed in claim 16 further comprising:

means for cooling said cog belt.

20. A gas turbine engine as claimed in claim 17 further comprising:

means for cooling said cog belt.

21. A gas turbine engine as claimed in claim 13 further comprising:

an ejector mounted to said side cover for inducing cooling flow through said cavity in said side cover, said side cover further including portions forming holes.

22. A gas turbine engine as claimed in claim 11 further comprising:

an ejector adjacent to said housing.

23. A gas turbine engine as claimed in claim 11 further comprising:

a first diaphragm seal mounted adjacent to said heat exchanger.

24. A gas turbine engine as claimed in claim 11 further comprising:

a first rubbing member mounted adjacent to said heat exchanger.

25. A gas turbine engine as claimed in claim 23 further comprising:

a second diaphragm seal interposed said side cover and said heat exchanger.

26. A gas turbine engine as claimed in claim 23 further comprising:

a second rubbing member mounted to said side cover.

27. A gas turbine engine as claimed in claim 12 wherein said side cover further including a pin engaging said side cover and said heat exchanger further including a disc and means for rotating said disc about said pin.

28. A gas turbine engine as claimed in claim 27 wherein said side cover further including a carbon barrel interposed said pin and said disc.

29. A gas turbine engine for producing power utilizing a fluid medium, said turbine engine comprising:

a gas generator having a compressor member for compressing the fluid medium, a first turbine member for driving said compressor member and a combustion member interposed said compressor member and said first turbine member for increasing the temperature of the fluid medium prior to said first turbine member;

a second turbine member adjacent to said gas generator for extracting power from the fluid medium as the fluid medium passes through said second turbine member; and a rotary disc heat scavenging member adjacent to said gas generator, said rotary disc heat scavenging member passing the fluid medium from said compressor member at least two times through said rotary disc heat scavenging member and passing the fluid medium for said second turbine once through said rotary disc heat scavenging member.

30. A gas turbine engine as claimed in claim 29 wherein said disc heat exchanging member further including a side wall and further comprising:

a clamp member adjacent to said side wall of said rotary disc member.

31. A gas turbine engine as claimed in claim 29 further comprising:

a particle separating member adjacent to said rotary heat exchanging disc, said particle separating member extracting particles in the fluid medium between the first pass of the fluid medium from said compressor member through said rotary disc heat exchanging member and the second pass of the fluid medium from said compressor member through said rotary disc heat exchanging member.

32. A gas turbine engine as claimed in claim 30 wherein said clamp member further including a male portion having a pin and a female portion having a tube which is connected to said pin.

* * * * *